United States Patent Office

3,491,084
Patented Jan. 20, 1970

3,491,084
PROCESS FOR THE PRODUCTION OF ARYLAZO CARBONYL COMPOUNDS
Siegfried Huenig and Theophil Eicher, Wurzburg, Germany, assignors to Badische Anilin- & Soda-Fabrik Aktiengesellschaft, Ludwigshafen (Rhine), Germany
No Drawing. Filed May 24, 1966, Ser. No. 552,410
Claims priority, application Germany, June 1, 1965,
B 82,204
Int. Cl. C09b 27/00
U.S. Cl. 260—192       6 Claims

ABSTRACT OF THE DISCLOSURE

Process of producing an arylazo carbonyl compound by reacting an O-alkylnitrosimmonium salt with a carboxylic acid salt in water, water-miscible solvents or mixtures thereof and at a temperature of −20° C. to +30° C.

---

The present invention relates to a new process for the production of arylazo carbonyl compounds having the general Formula I $$R^1-N=N-CO-R^2 \quad (I)$$

in which $R^1$ denotes an aromatic group free from active in a chemically original manner by reacting O-alkylphatic, araliphatic or aromatic group.

The object of the present invention is to make the compounds (I) more readily accessible technically than has hitherto been possible.

We have found that these compounds can be obtained in a chemically orginal manner by reacting o-alkylnitrosimmonium salts having the general Formula II $$\begin{bmatrix} R'-CH-R'' \\ | \\ R^1-N=N-O-R''' \end{bmatrix}^{\oplus} X^{\ominus} \quad (II)$$

in which $R^1$ has the meaning given above, $R'$ denotes a hydrogen atoms and $R^2$ denotes an aliphatic, cycloalia hydrogen atom or an alkyl group, $R'''$ denotes an alkyl group and $X^{\ominus}$ denotes the equivalent of a strong acid, with carboxylic acid salts having the general Formula III $$R^2-COO^{\ominus}Me^{\oplus} \quad (III)$$

in which $R^2$ has the means given above and $Me^{\oplus}$ denotes the equivalent of a metal cation, preferably in the homogeneous liquid phase and isolating the products in a conventional manner.

The reaction according to the present invention, in which the alcohols (IV) and the aldehydes or ketones (V) are obtained as byproducts, may be formulated as follows:

$$\begin{bmatrix} R'-CH-R'' \\ | \\ R^1-C=N-O-R''' \end{bmatrix}^{\oplus} X^{\ominus} + R^2-CO-O^{\ominus}Me^{\oplus} \longrightarrow$$
(II)                                  (III)

$$R^1-N=N-CO-R^2 + R'''-OH + R'-CO-R'' + Me^{\oplus}X^{\ominus}$$
(I)                  (IV)              (V)

The O-alkylnitrosimmonium salts (II) are obtainable according to the process described in U.S. Patent No. 3,275,639 by alkylation of N-nitrosoamines (IIa)

$$\begin{matrix} R'-CH-R'' \\ | \\ R^1-N-N=O \end{matrix} \quad (IIa)$$

with strong alkylating agents which introduce the radical $R'''$ into (IIa) with the formation of an oxonium salt. Suitable $R^1$ radicals in the starting compounds (II) are aryl groups such as the phenyl, α-naphthyl or β-naphthyl group as well as their alkyl, alkoxy, carbalkoxy, acyl, halogen, cyano, nitro and alkylsulfonyl derivatives. Provided $R^1$ contains no active hydrogen atoms, the success of the reaction, according to observations up to now, is not dependent on the type of the remaining substituents in this radical.

Since the molecule portion of (II) containing the radicals $R'$ and $R''$ is split off anyway in the course of the reaction with the formation of the carbonyl compound (V), those starting compounds (II) are preferred in which $R'$ and $R''$ are simple radicals such as hydrogen or lower alkyl groups (about $C_1$-$C_6$).

Similar considerations apply in the case of $R'''$ which preferably denotes a lower alkyl group.

Examples of radicals $X^{\ominus}$ of strong acids are fluoborate, perchlorate, hexachloroantimonate and methyl sulfate.

Examples of the many other O-alkylnitrosimmonium salts (II) coming under the above definition are:
N-phenyl-N-methyl-O-nitrosimmonium fluoborate,
N-(4-tolyl)-N-ethyl-O-methylnitrosimmonium perchlorate,
N-(4-chlorphenyl)-N-isopropyl-O-ethylnitrosimmonium hexachloroantimonate and
N-(4-methoxyphenyl)-N-benzyl-O-ethylnitrosimmonium fluoborate.

Preferred carboxylic salts (III) are those which are soluble in water, in strongly polar solvents such as dimethylformamide or in mixtures of water-soluble organic solvents and water. Alkali metal and magnesium salts of the corresponding carboxylic acids generally satisfy this condition. Apart from the solubility properties, however, there is no objection to the use of aluminum or zinc salts for example.

Examples of carboxylic acids on which the starting compounds (III) may be based are aliphatic carboxylic acids with two to eighteen carbon atoms such as acetic acid, propionic acid, acrylic acid, butyric acid, crotonic acid, oleic acid and stearic acid; cycloaliphatic carboxylic acids such as hexahydrobenzoic acid; araliphatic carboxylic acids such as phenylacetic acid and cinnamic acid, and aromatic carboxylic acid such as benzoic acid, naphthoic acid as well as the alkyl, alkoxy, carbalkoxy, acyl, alkylsulfonyl, halogen, cyano and nitro derivatives of these aromatic carboxylic acids. These acids provide the radical $R^2$ by removal of the carboxyl group, i.e. so that $R^2$ may be an unsubstituted aliphatic hydrocarbon radical of 1 to 17 carbon atoms or its substituted derivatives such as alkyl of 1 to 5 carbon atoms substituted by chlorine or carbobenzoxyamino (—NH—Cbzo) as illustrated in the working examples; $R^2$ may also be the following radicals as derived from the noted acids:

| Acid: | $R_2$ |
|---|---|
| Hexahydrobenzoic acid | cyclohexyl |
| Phenylacetic acid | phenyl—$CH_2$— |
| Cinnamic acid | phenyl—CH=CH— |
| Benzoic acid | phenyl |
| Naphthoic acid | naphthyl |

The process according to the present invention is of particular interest when the starting materials (III) used are aminocarboxylic acids in which the amino group is protected, for example by a carbobenzoxy group (Cbzo). Here compounds are obtained of the type $$R^1-N=N-CO-CH_2-NH-Cbzo$$

which, according to the process described in J. Org. Chem. vol. 30 (1965), p. 64, for the synthesis of peptides with esters of aminocarboxylic acids, react to form new peptide bonds as follows:

$$ROOC-CH_2-NH_2 + CO-CH_2-NH-Cbzo \longrightarrow$$
$$\qquad\qquad\qquad\qquad\quad\;\; \underset{|}{N}=N-R^1$$

$$ROOC-CH_2-NH-CO-CH_2-NH-Cbzo + N_2 + R^1H$$
(R-alkyl)

Although reactants (II) and (III) react with one another in stoichiometric amounts, it is advantageous in some cases, in order to accelerate the reaction, to use a certain molar excess of component (III), namely up to about ten times the molar amount of (II).

Since the reaction proceeds most quickly in the homogeneous phase it is advisable to carry out the reaction in a solvent. Particularly suitable solvents are water and liquids miscible with water such as acetonitrile, acetone, ethanol, methanol, dimethylformamide and mixtures of these solvents. If the two components (II) and (III) are not soluble in the same solvent, mixtures of two solvents which are not soluble in each other may be used, one component dissolving in the one solvevnt and the other component in the other solvent.

If water is used as the solvent or the latter contains water, the pH value of the solution is kept advantageously between 4 and 10, preferably between 5 and 7. The reaction is accelerated by removing the acid HX, primarily splitting off from (II), from the equilibrium with about 1 to 5 moles of a basic reagent, preferably with excess salt of the carboxylic acid used, but also, for example, with sodium carbonate or sodium hydrogen carbonate.

The reaction according to the present invention proceeds particularly smoothly in the temperature range of $-20°$ to $+30°$ C., in particular around 0° C. These values, however, are not critical, for at lower temperatures the reaction merely proceeds more slowly and at higher temperatures the yield generally begins to drop, since both (I) and (II) are thermolabile.

If the products (I) do not precipitate from the reaction medium immediately, they can be extracted with a suitable solvent, for example ether or methylene chloride, and then isolated in conventional manner.

The present invention is a valuable contribution to the art in that it provides a chemically original process for the production of carbonyl azo compounds. These compounds are important not only as reactive intermediate products for numerous organic syntheses but also as expanding agents for the production of foamed plastics since they split off nitrogen under heat. In the case of aminocarboxylic acids with protected amino groups the corresponding arylazoaminocarbonyl compounds are obtained which are of great importance for peptide syntheses.

EXAMPLES 1 TO 22

In each case $x$ moles of an O-alkylnitrosimmonium salt II having the formula

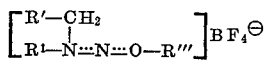

the $R^1$, $R'$ and $R'''$ radicals of which are defined in the following table and which had been prepared according to the process of said U.S. Patent No. 3,275,639 is reacted while stirring in the course of $t$ hours at T° C. together with $y$ moles of a carboxylic acid sodium salt (III), characterized by the $R^2$ radical, in about 50 to 150 ml. of water at the initial pH value set up by the components.

In all cases the reaction product (I) precipitates from the aqueous phase. The yield is $p$ percent with reference to (II).

The identity of the products is established by elementary analysis and by comparison (e.g. mixed melting point) with the same compounds prepared by another method.

The data and results of the various experiments are given in the following table:

TABLE

| | II | | | | III | Reaction conditions | | | I | |
|---|---|---|---|---|---|---|---|---|---|---|
| | $R^1$ | $R'$ | $R'''$ | $x$ [mole] | $R^2$ | $y$ [mole] | pH | T [°C.] | $t$ [h] | | $p$ [percent] |
| 1 | C₆H₅ | H | C₂H₅ | 0.02 | C₆H₅ | 0.104 | 5–6 | 0–10 | 1 | C₆H₅–N=N–CO–C₆H₅ | 95 |
| 2 | 4-CH₃–C₆H₄ | H | C₂H₅ | 0.05 | C₆H₅ | 0.150 | 5–6 | 0–10 | 2 | 4-CH₃–C₆H₄–N=N–CO–C₆H₄–CH₃-4 | 85 |
| 3 | 4-CH₃–C₆H₄ | H | C₂H₅ | 0.05 | 4-CH₃–C₆H₄ | 0.158 | 5–6 | 0–10 | 1.5 | 4-CH₃–C₆H₄–N=N–CO–C₆H₄–Cl-4 | 55 |
| 4 | 4-CH₃–C₆H₄ | H | C₂H₅ | 0.028 | 4-Cl–C₆H₄ | 0.150 | 5–6 | 0–10 | 1.5 | 4-CH₃–C₆H₄–N=N–CO–C₆H₄–NO₂-4 | 88 |
| 5 | 4-CH₃–C₆H₄ | H | C₂H₅ | 0.02 | 4-NO₂–C₆H₄ | 0.10 | 6 | 0–10 | 0.25 | 4-Cl–C₆H₄–N=N–CO–C₆H₄ | 61 |
| 6 | 4-Cl–C₆H₄ | H | C₂H₅ | 0.014 | C₆H₅ | 0.140 | 5–6 | 0–10 | 1.5 | 4-Cl–C₆H₄–N=N–CO–C₆H₄–CH₃-4 | 98 |
| 7 | 4-Cl–C₆H₄ | H | C₂H₅ | 0.029 | 4-CH₃–C₆H₄ | 0.130 | 5–6 | 0–10 | 1.75 | | 62 |

TABLE

| | II | R' | R'' | x [mole] | R² | y [mole] | pH | T [°C] | t [h] | I | p [percent] |
|---|---|---|---|---|---|---|---|---|---|---|---|
| 8 | 4-Cl-C₆H₄– | H | C₂H₅ | 0.029 | 4-Cl-C₆H₄– | 0.150 | 5–6 | 0–10 | 2.0 | 4-Cl-C₆H₄–N=N–CO–C₆H₄-4-Cl | 83 |
| 9 | 4-Cl-C₆H₄– | H | C₂H₅ | 0.020 | 4-NO₂-C₆H₄– | 0.100 | 6 | 0–10 | 0.25 | 4-Cl-C₆H₄–N=N–CO–C₆H₄-4-NO₂ | 64 |
| 10 | 4-NO₂-C₆H₄– | H | C₂H₅ | 0.017 | 4-CH₃-C₆H₄– | 0.160 | 5–6 | 0–10 | 2.0 | 4-NO₂-C₆H₄–N=N–CO–C₆H₄-4-CH₃ | 73 |
| 11 | C₆H₅– | H | C₂H₅ | 0.02 | CH₃– | 0.22 | 6–7 | 0–10 | 0.5 | C₆H₅–N=N–CO–CH₃ | 29 |
| 12 | C₆H₅– | H | C₂H₅ | 0.02 | (CH₃)₃C– | 0.127 | 6–7 | 0–10 | 1.0 | C₆H₅–N=N–CO–C(CH₃)₃ | 85 |
| 13 | C₆H₅– | CH₃–C₆H₅ | C₂H₅ | 0.02 | C₆H₅– | 0.104 | 6–7 | 0–10 | 1.0 | C₆H₅–N=N–CO–C₆H₅ | 92 |
| 14 | C₆H₅– | H | C₂H₅ | 0.02 | CH₃ | 0.37 | 6–7 | 0–10 | 0.5 | C₆H₅–N=N–CO–CH₃ | 55 |
| 15 | C₆H₅– | H | CH₃ | 0.01 | CH₃ | 0.06 | 6–7 | 0–10 | 1.5 | C₆H₅–N=N–CO–CH₃ | 96 |
| 16 | 4-CH₃O-C₆H₄– | H | CH₃ | 0.01 | CH₃ | 0.06 | 6–7 | 0–10 | 1.5 | 4-CH₃O-C₆H₄–N=N–CO–C₆H₅ | 90 |
| 17 | 4-CH₃O-C₆H₄– | H | CH₃ | 0.01 | 4-NO₂-C₆H₄– | 0.07 | 6–7 | 0–10 | 1.0 | 4-CH₃O-C₆H₄–N=N–CO–C₆H₄-4-NO₂ | 84 |
| 18 | 4-CH₃O-C₆H₄– | H | CH₃ | 0.01 | –CH₃ | 0.06 | 6–7 | 0–10 | 1.0 | 4-CH₃O-C₆H₄–N=N–CO–CH₃ | 50 |
| 19 | C₆H₅– | H | C₂H₅ | 0.01 | –CH₂–NH–Cbzo | 0.01 | 6–7 | 0 | 2.0 | C₆H₅–N=N–CO–CH₂–NH–Cbzo | 91 |
| 20 | C₆H₅– | H | C₂H₅ | 0.01 | –CH(C₄H₉)–NH–Cbzo | 0.01 | 6–7 | 0 | 1.0 | C₆H₅–N=N–CO–CH(C₄H₉)–NH–Cbzo | 72 |
| 21 | C₆H₅– | H | C₂H₅ | 0.02 | –CCl₃ | 0.105 | 6–7 | 0–10 | 1.0 | C₆H₅–N=N–CO–CCl₃ | 33 |
| 22 | 4-CH₃O-C₆H₄– | H | CH₃ | 0.10 | –CH₃ | 0.10 | 6–7 | 0–10 | 0.8 | 4-CH₃O-C₆H₄–N=N–CO–CH₃ | 51 |

We claim:
1. A process for the production of an arylazo compound of the formula

$$R^1-N=N-CO-R^2 \qquad (I)$$

wherein $R^1$ denotes an aromatic radical free of active hydrogen atoms and selected from the group consisting of phenyl, naphthyl and phenyl substituted by methyl, methoxy, chlorine or nitro and $R^2$ denotes a radical selected from the group consisting of an unsubstituted aliphatic hydrocarbon radical of 1 to 17 carbon atoms, alkyl of 1 to 5 atoms substituted by chlorine or —NH-carbobenzoxy, cyclohexyl, phenyl-$CH_2$—, $$phenyl-CH=CH-$$

phenyl, naphthyl, and phenyl substituted by methyl, chlorine or nitro, said process comprising:
 reacting in a solvent selected from the group consisting of water, water-miscible organic solvents and mixtures thereof and at a temperature of about $-20°$ C. to $+30°$ C. an 0-alkylnitro-simmonium salt of the formula $$\left[ \begin{array}{c} R'-CH-R'' \\ R^1-N=N=O-R''' \end{array} \right]^{\oplus} X^{\ominus} \qquad (II)$$

wherein $R^1$ has the meaning given above, $R'$ denotes a member selected from the group consisting of hydrogen, methyl and phenyl, $R''$ denotes hydrogen, $R'''$ denotes methyl or ethyl and $X^{\ominus}$ denotes an equivalent anion selected from the group consisting of fluoborate, perchlorate, hexachloroantimonate and methyl sulfate, with a carboxylic acid salt of the formula $$R^2-COO^{\ominus}Me^{\oplus} \qquad (III)$$

wherein $R^2$ has the meaning given above and $Me^{\oplus}$ denotes the equivalent cation of a metal selected from the group consisting of an alkali metal, magnesium, aluminum and zinc; and isolating the product of the Formula I.

2. A process as claimed in claim 1 wherein the reaction of (II) and (III) is carried out in a homogeneous solution thereof.

3. A process as claimed in claim 1 wherein the reaction of (II) and (III) is carried out in water.

4. A process as claimed in claim 3 wherein the reaction is carried out at a pH of about 4 to 10 and in the presence of sodium carbonate or sodium hydrogen carbonate.

5. A process as claimed in claim 1 wherein the reaction is carried out at a temperature of approximately 0° C.

6. A process as claimed in claim 1 wherein the reactant (III) is an α-aminocarboxylic acid salt bearing the N-carbobenzoxy group.

No references cited.

CHARLES B. PARKER, Primary Examiner
CHARLES F. WARREN, Assistant Examiner

U.S. Cl. X.R.

260—141

PO-1050
(5/69)

UNITED STATES PATENT OFFICE
CERTIFICATE OF CORRECTION

Patent No. 3,491,084　　　　　　　　　Dated January 20, 1970

Inventor(s) Siegfried Huenig et al

It is certified that error appears in the above-identified patent and that said Letters Patent are hereby corrected as shown below:

Column 1, line 40, "atoms and $R^2$ denotes an aliphatic, cycloali-" should read --atom, an alkyl or an aryl group R" denotes--; line 56, "$R^1$-C" should read '''$R^1$-N'''; line 69, a new paragraph should begin with "Suitable".

Column 2, line 18, "fluoroborate" should read --fluoborate--.

Column 3, line 14, "solvevnt" should read --solvent--.

SIGNED AND
SEALED
JUN 23 1970

(SEAL)
Attest:

Edward M. Fletcher, Jr.
Attesting Officer

WILLIAM E. SCHUYLER, JR.
Commissioner of Patents